(12) United States Patent
Gong

(10) Patent No.: US 9,272,605 B1
(45) Date of Patent: Mar. 1, 2016

(54) HOLDING STRUCTURE AND VEHICLE SUNSHADE USED THEREOF

(71) Applicant: CREATIVE & COOPERATIVE INTERNATIONAL, INC., Taipei (TW)

(72) Inventor: Jing-Shyong Gong, Taipei (TW)

(73) Assignee: CREATIVE & COOPERATIVE INTERNATIONAL, INC., Taipei (TW)

( * ) Notice: Subject to any disclaimer, the term of this patent is extended or adjusted under 35 U.S.C. 154(b) by 0 days.

(21) Appl. No.: 14/503,927

(22) Filed: Oct. 1, 2014

(51) Int. Cl.
*B60J 1/08* (2006.01)
*B60J 1/20* (2006.01)

(52) U.S. Cl.
CPC .... *B60J 1/08* (2013.01); *B60J 1/20* (2013.01); *B60J 1/2011* (2013.01)

(58) Field of Classification Search
CPC ............ B60J 3/00; B60J 3/002; B60J 3/0286; B60J 3/005; B60J 1/08; B60J 1/10; B60J 1/20; B60J 1/2011; B60J 1/2036; B60J 1/2047; B60J 1/2086
USPC .............................. 296/97.1, 97.6, 97.7, 97.9
See application file for complete search history.

(56) References Cited

U.S. PATENT DOCUMENTS

| | | | | |
|---|---|---|---|---|
| 4,898,111 A * | 2/1990 | Hackney | ...................... | 114/61.23 |
| 5,984,405 A * | 11/1999 | Ciacci | ............................ | 296/218 |
| 6,592,167 B2 * | 7/2003 | Haid et al. | .................... | 296/97.9 |
| 7,131,683 B1 * | 11/2006 | Gong | ............................ | 296/97.9 |
| 7,150,126 B2 * | 12/2006 | Rivera | ................................ | 49/62 |
| 7,393,041 B2 * | 7/2008 | Taqvi et al. | ................... | 296/97.5 |
| 2005/0211400 A1 * | 9/2005 | Schiraldi | .................. | 160/370.21 |
| 2007/0107858 A1 * | 5/2007 | Liung Huang | ........... | 160/370.21 |

FOREIGN PATENT DOCUMENTS

TW        M287752         2/2006

\* cited by examiner

*Primary Examiner* — Gregory Blankenship
(74) *Attorney, Agent, or Firm* — Muncy, Geissler, Olds & Lowe, P.C.

(57) ABSTRACT

A holding structure and a vehicle sunshade used thereof includes a seat and a bonding member. The seat includes a body, a clamp portion connected to the body and an extended portion connected to the body and extended in a direction remote from the clamp portion. The body has a first connection plane faced the extended portion. The extended portion has a second connection plane faced the body. The bonding member is bonded to the first connection plane and the second connection plane, and includes a first bonding surface corresponding to the first connection plane and a second bonding surface corresponding to the second connection plane. The invention can hold the vehicle sunshade on a vehicle window frame and provide firmer bonding of the vehicle sunshade to the vehicle window frame through the two bonding surfaces.

10 Claims, 12 Drawing Sheets

HOLDING STRUCTURE AND VEHICLE SUNSHADE USED THEREOF

FIELD OF THE INVENTION

The present invention relates to a holding structure and a vehicle sunshade used the holding structure and particularly to a holding structure to enhance bonding stability between a sunshade and a vehicle window frame and a vehicle sunshade used the holding structure.

BACKGROUND OF THE INVENTION

When a vehicle is moving sunshine often projects into the vehicle through vehicle windows. Strong sunshine not only irritates driver's eyes and affects driver's visual sight, also exposes the driver or passengers in the sunshine that could cause sunburn on their skin. To mitigate such concerns many types of sunshades have been developed and marketed, such as electrostatic sunshade that can be attached to vehicle windows, suction cup sunshade capable of sucking on the vehicle windows or the like. However, those sunshade products are directly attached to the vehicle windows. In the event that users want to lower the vehicle windows, the sunshade products have to be removed first. They are quite inconvenient in use.

To solve the aforesaid problem Taiwan Patent No. M287752 discloses a vehicle sunshade holding block, please referring to FIG. 1. The holding block 200 includes a double-sided adhesive 210 and a holding zone 220 formed in the middle of the holding block 200 with a narrower outer side and a wider inner side and also remote from the double-sided adhesive 210. The holding block 200 can be bonded to a plane of a vehicle window frame 320 through the double-sided adhesive 210. A sunshade 400 formed via a shade cloth covered by a flexible element can be flexibly inserted into the holding zone 220, thereby the sunshade 400 can be connected to the border frame around the vehicle window without directly bonding to the vehicle window, hence the vehicle window can be opened without removing the sunshade in advance, thus improve usability.

However, the aforesaid holding block 200 bonds via the double-sided adhesive 210 on a plane. In the event that the plane area of the vehicle window frame is smaller the double-sided adhesive 210 could not fully bond to the vehicle window frame 320 as shown in FIG. 2. However, shrinking the bonding area of the double-sided adhesive 210 on the vehicle window frame 320, bonding force of the holding block 200 decreases. In the event that users remove the sunshade 400 improperly the holding block 200 could easily loosen and drop from the vehicle window frame. Hence there is still room for improvement.

SUMMARY OF THE INVENTION

The primary object of the present invention is to solve the problem of the conventional sunshade holding block in the prior art that bonds to the vehicle window frame through merely a single plane that results in infirm bonding of the sunshade on the vehicle window frame.

To achieve the foregoing object, the present invention provides a holding structure that includes a seat and a bonding member. The seat includes a body, a clamp portion connected to one side of the body and an extended portion connected to the body and extended in a direction remote from the clamp portion. The body has a first connection plane faced the extended portion. The extended portion has a second connection plane faced the body. The bonding member is bonded to the first connection plane and the second connection plane, and includes a first bonding surface corresponding to the first connection plane and a second bonding surface corresponding to the second connection plane.

In one aspect the clamp portion has two extended sections located at one side of the body remote from the extended portion and spaced from each other, and two hook sections located respectively at one end of one extended section remote from the body and extended to another extended section.

In another aspect the second connection plane is formed in a trapezoidal shape with a gradually shrinking width in a direction remote from the body; the extended portion has two chamfered angles at one end thereof remote from the body.

In yet another aspect the bonding member has a first adhesive bonded to the first connection plane and faced one side of the second connection plane to form the first bonding surface, and a second adhesive bonded to the second connection plane and faced one side of the first connection plane to form the second bonding surface.

In yet another aspect the bonding member includes a release layer covered the first bonding surface and the second bonding surface.

Another object of the invention is to provide a vehicle sunshade installed on a vehicle to block light outside the vehicle. The vehicle includes at least one light permeable plane and a plurality of vehicle window frames located annularly on the circumference of each light permeable plane. Each vehicle window frame has two non-parallel window frame planes. The vehicle sunshade includes a shade screen, a seat and a bonding member. The shade screen corresponds to the light permeable plane, and includes a sunshade cloth to cover the light permeable plane and restrict light from entering the vehicle and a support frame formed annularly on the circumference of the sunshade cloth. The seat includes a body, a clamp portion connected to one side of the body and wedged in the support frame for coupling therewith, and an extended portion connected to the body and extended in a direction remote from the clamp portion. The body has a first connection plane faced the extended portion. The extended portion has a second connection plane faced the body. The bonding member is bonded to the first connection plane and the second connection plane, and includes a first bonding surface corresponding to the first connection plane and a second bonding surface corresponding to the second connection plane. The first bonding surface and the second bonding surface bond respectively to two window frame planes of the vehicle window frame.

In one aspect the clamp portion has two extended sections located at one side of the body remote from the extended portion and spaced from each other, and two hook sections located respectively at one end of one extended section remote from the body and extended to another extended section, and an opening located between the two hook sections to be wedged in by the support frame.

In another aspect one of the vehicle window frames has a gap formed between the vehicle window frame and the light permeable plane, and the extended portion of the body is inserted in the gap.

In yet another aspect the vehicle sunshade further includes at least one holding block corresponding to the seat and located on one vehicle window frame. Each holding block has a holding zone to be wedged by the support frame for coupling therewith and a double-sided adhesive located on one side remote from the holding zone to bond to the vehicle window frame.

The invention thus formed, compared with the conventional techniques, provides many advantages, notably:

1. The holding structure has two bonding surfaces to bond to two non-parallel window frame planes of the vehicle window frame, or can be inserted in the gap formed between light permeable plane and the vehicle window frame via the extended portion of the seat, hence bonding stability of the vehicle sunshade held on the vehicle window frame can be enhanced. In addition, the holding structure of the invention can be installed on the front window, side windows or rear window of the vehicle body.

2. The invention can be collaborated with the conventional holding block to achieve improved holding efficacy. The holding structure of the invention can be bonded to the bend portion of the vehicle window frame, while the conventional holding block can be bonded to the flat surface of the vehicle window frame, then the shade screen of the invention can be positioned between the holding structure of the invention and the conventional holding block, thereby is adaptable to different types of vehicle window frames to improve applicability.

The foregoing, as well as additional objects, features and advantages of the invention will be more readily apparent from the following embodiments and detailed description, which proceed with reference to the accompanying drawings. It is to be noted that the embodiments are merely for illustrative purpose and not the limitation of the invention. The drawings are not made in actual ratio and also not to limit the claims of the invention.

DETAILED DESCRIPTION OF THE PREFERRED EMBODIMENTS

Figure 3:
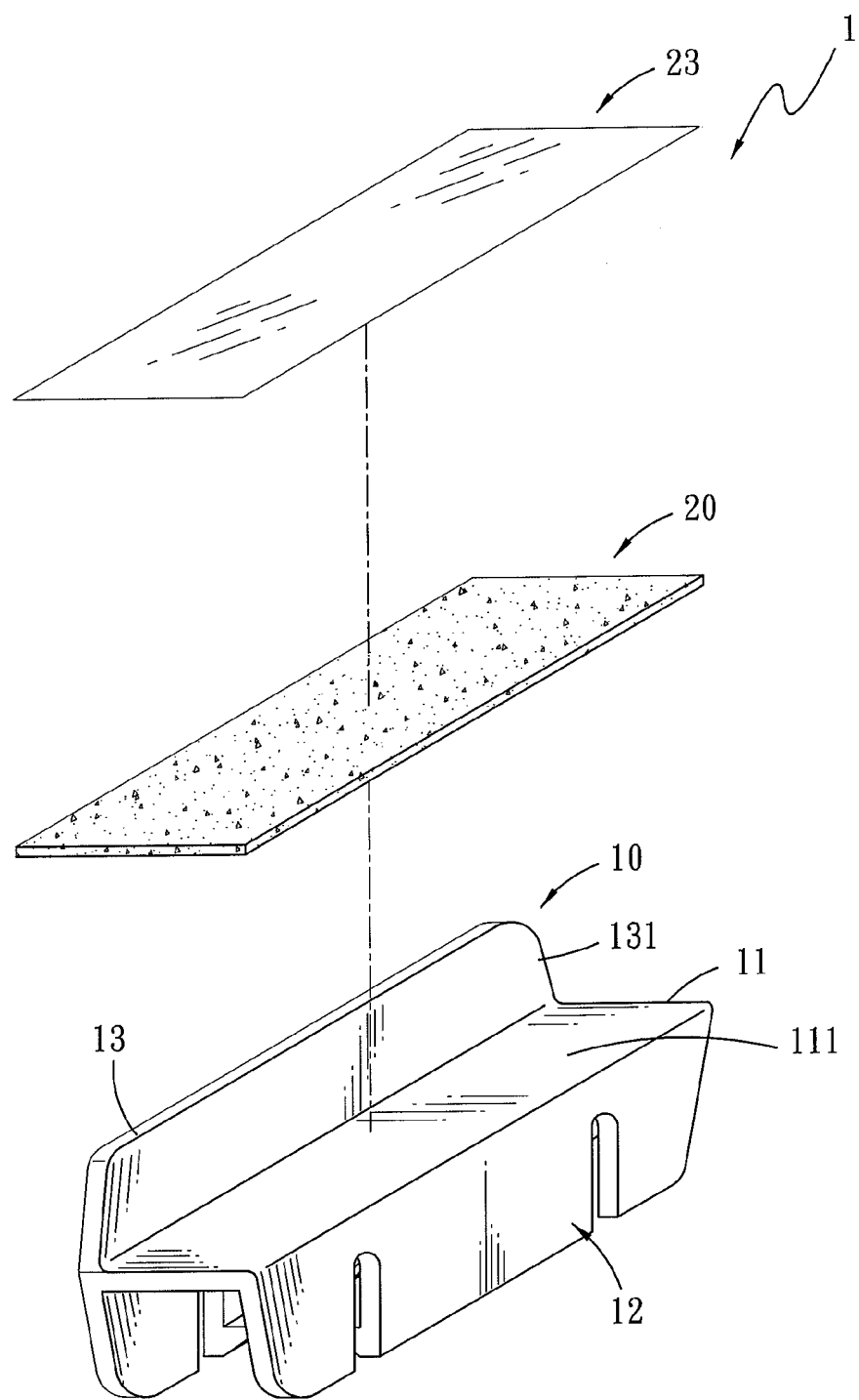
FIG. 3 is an exploded view of the holding structure of the invention.
Figure 4A:
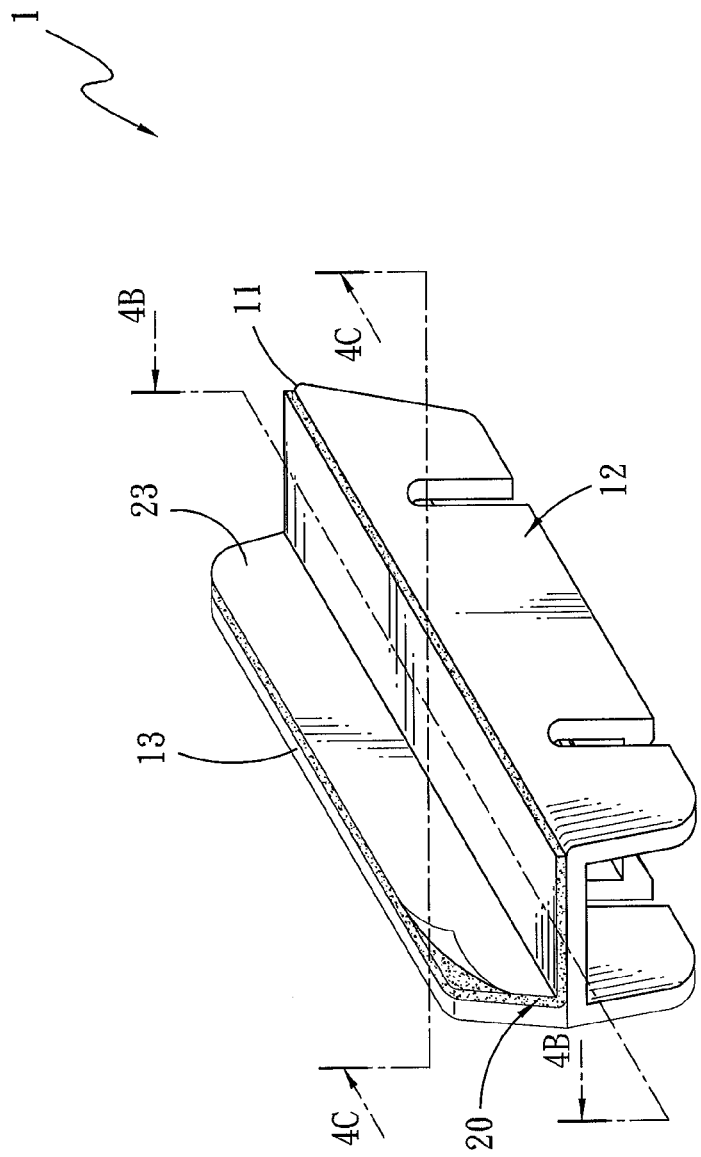
FIG. 4A is a perspective view of the holding structure of the invention.

Please referring to FIGS. 3 and 4A, the present invention aims to provide a holding structure 1 mainly to hold a vehicle sunshade on a vehicle window frame. The holding structure 1 includes a seat 10 and a bonding member 20.

Figure 4B:
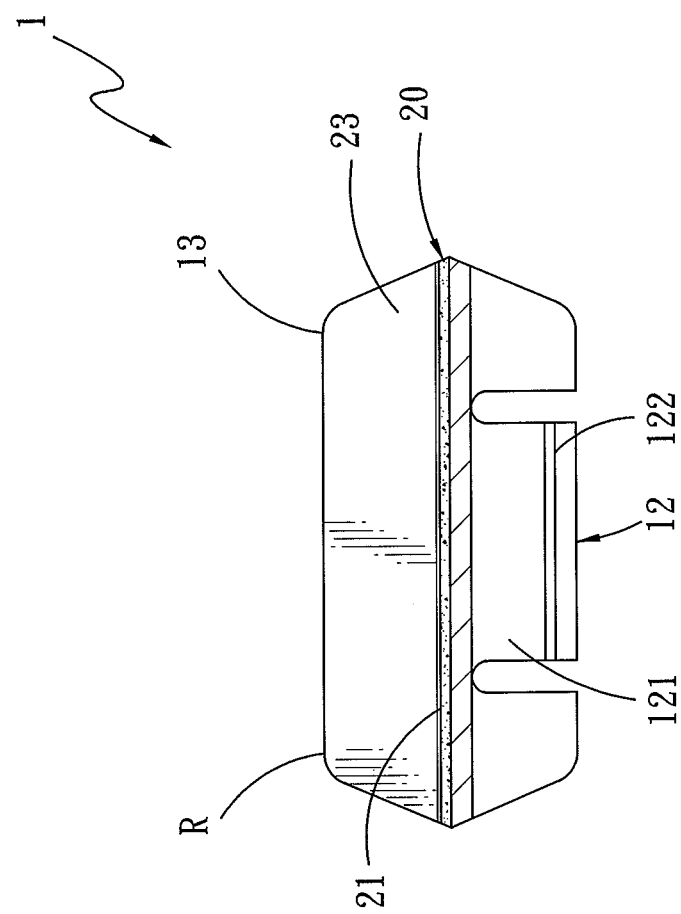
FIG. 4B is a plane sectional view taken on line 4B-4B in FIG. 4A.
Figure 4C:
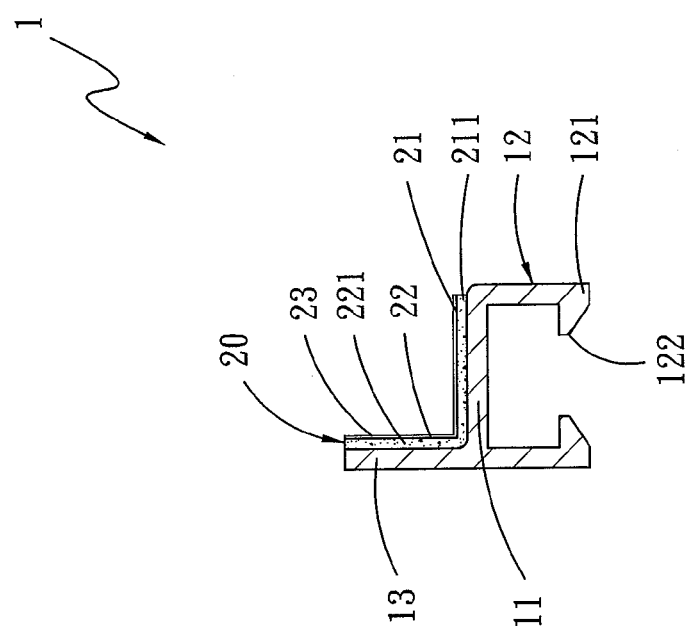
FIG. 4C is a plane sectional view taken on line 4C-4C in FIG. 4A.

More specifically, the seat 10 includes a body 11, a clamp portion 12 connected to one side of the body 11 and an extended portion 13 connected to the body and extended in a direction remote from the clamp portion 12. The body 11 has a first connection plane 111 faced the extended portion 13. The extended portion 13 has a second connection plane 131 faced the body 11. Also referring to FIGS. 4B and 4C, the clamp portion 12 has two extended sections 121 at one side of the body 11 remote from the extended portion 13 and spaced from each other, and two hook sections 122 each is located at one end of one extended section 121 remote from the body 11 and extended toward another extended section 121 so that the vehicle sunshade can be wedged in between the extended sections 121 and harnessed by the hook sections 122 without loosening away easily. In addition, the second connection plane 131 is extended in a direction remote from the body 11 and formed in a trapezoidal shape with a width gradually shrunk. The extended portion 13 has two chamfered angles R at one end thereof remote from the body 11 to avoid the extended portion 13 from scraping the surface of the vehicle window frame when it is connected to the side frame of the vehicle window.

The bonding member 20 is coupled on the seat 10 and bonded to the first connection plane 111 and the second connection plane 131, and includes a first bonding surface 21 corresponding to the first connection plane 111 and a second bonding surface 22 corresponding to the second connection plane 131. Please referring to FIG. 4C, the bonding member 20 can be adhesive material such as super glue, double-sided adhesive or the like. In one embodiment the bonding member 20 is a bent double-sided adhesive. Moreover, the bonding member 20 is divided into two portions, one portion is bonded to the first connection plane 111 and faces the second connection plane 131 to become a first adhesive 211 contained the first bonding surface 21, and the other portion is bonded to the second connection plane 131 and faces the first connection plane 111 to become a second adhesive 221 contained the second bonding surface 22. The first bonding surface 21 and the second bonding surface 22 are planes perpendicular to each other or crossed with each other in a slant manner. Thus the first adhesive 211 and the second adhesive 221 can be formed integrally. When a user wants to peel the bonding member 20 off from a vehicle body, the bonding member 20 can be removed entirely without ripping partially to avoid the problem of leaving remanent adhesive on the vehicle body. In another embodiment the bonding member 20 can be two pieces of adhesives separately bonded to the first connection plane 111 and the second connection plane 131. In addition, the bonding member 20 further includes a release layer 23 attached to the first bonding surface 21 and the second bonding surface 22 to protect the first adhesive 211 and the second adhesive 221 from being contaminated by dust or dirt when not in use or bonding to other objects.

Figure 5A:
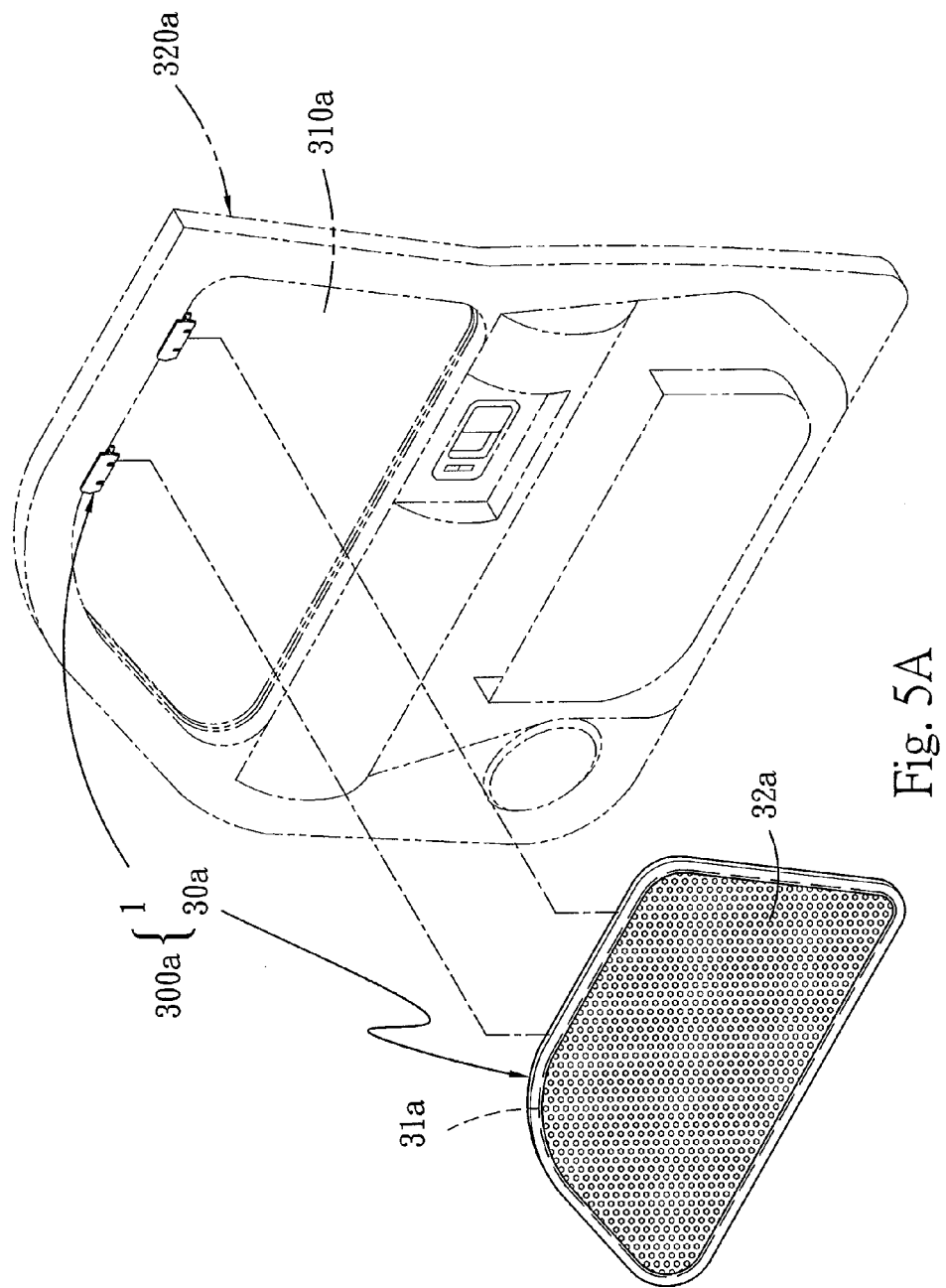
FIG. 5A is an exploded view of the vehicle sunshade of the invention in a first implementation condition.
Figure 5B:
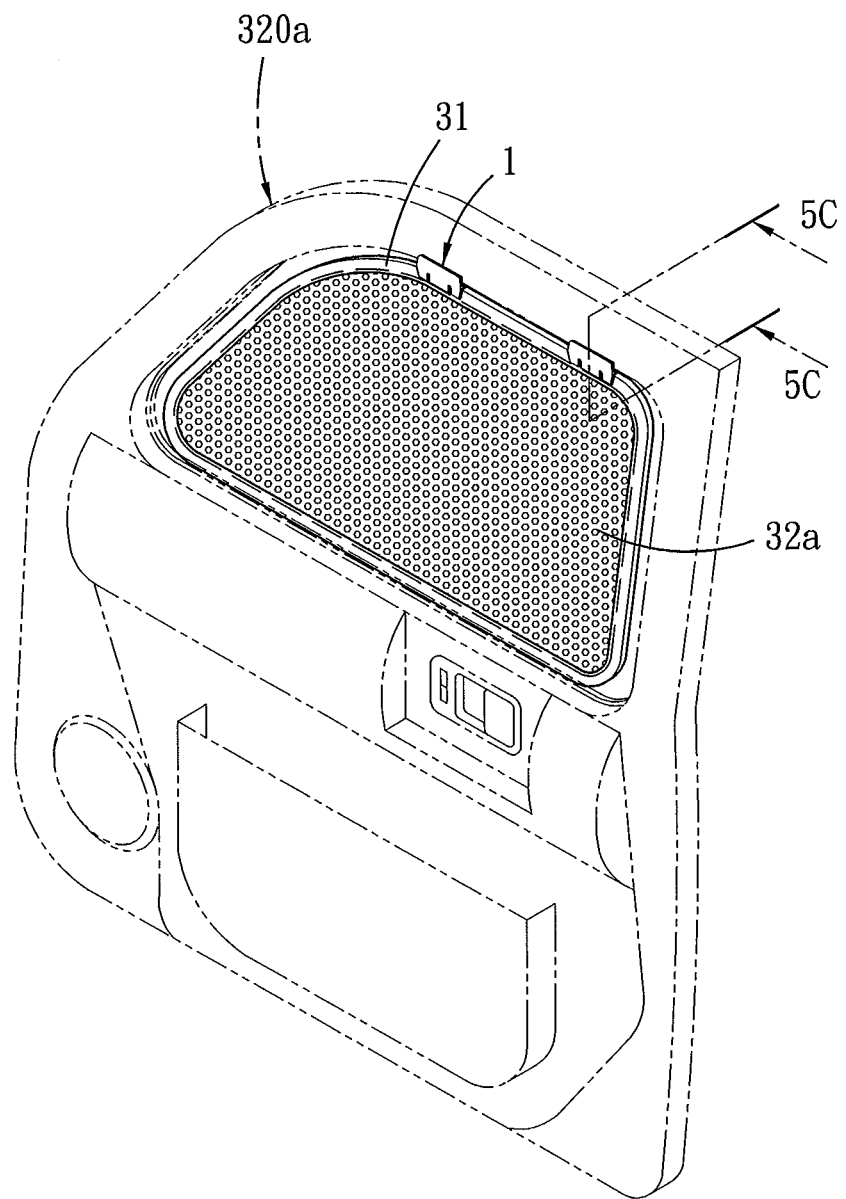
FIG. 5B is a perspective view of the vehicle sunshade of the invention in the first implementation condition.
Figure 5C:
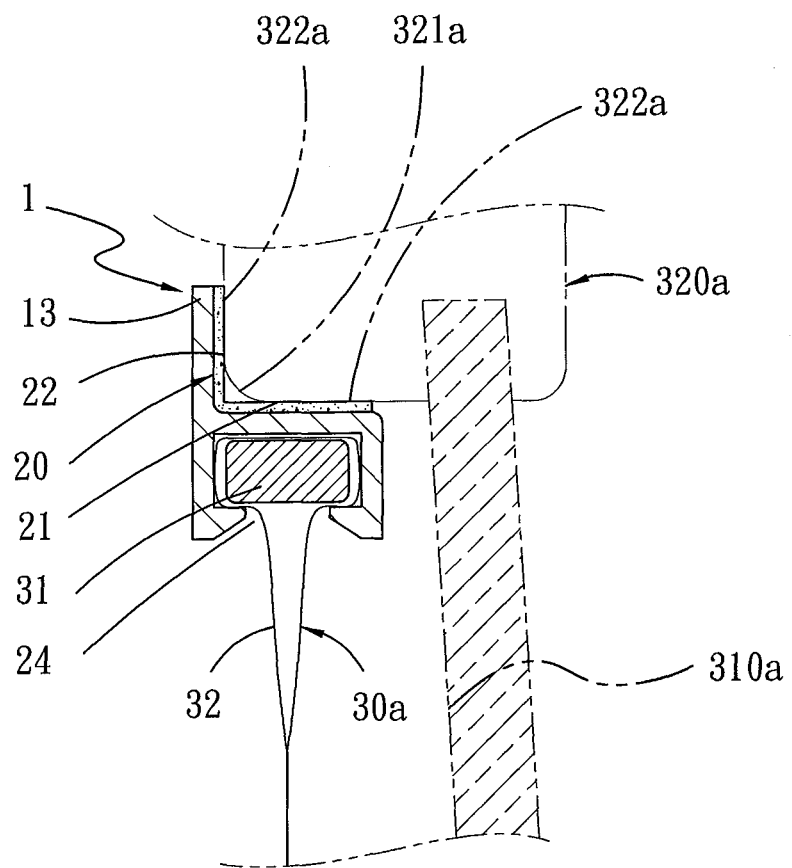
FIG. 5C is a plane sectional view taken on line 5C-5C in FIG. 5B.

Please refer to FIGS. 5A, 5B and 5C for a first embodiment of the vehicle sunshade of the invention. The vehicle sunshade 300a is installed on a vehicle to block light outside of the vehicle. The vehicle includes at least one light permeable plane 310a and a plurality of vehicle window frames 320a annularly located on the circumference of each light permeable plane 310a. Each vehicle window frame 320a has two non-parallel window frame planes 322a. In this embodiment the light permeable plane 310a means the plane of window glass at the front window, rear window or side windows of the vehicle where light can project into the vehicle. The non-parallel window frame planes 322a are planes at two ends of a bend portion 321a of the vehicle window frame 320a. The vehicle sunshade 300a can be bonded to the vehicle window frame 320a, and includes a shade screen 30a, a seat 10 and a bonding member 20.

The shade screen 30a corresponds to the light permeable plane 310a to block light outside the window from entering the vehicle, and includes a sunshade cloth 32a to cover the light permeable plane 310a to restrict light from entering the vehicle and a support frame 31a located annularly on the circumference of the sunshade cloth 32a. The support frame 31a can be made from flexible material to facilitate storing or installation. The sunshade cloth 32a can be a mesh type fabric. The shade screen 30a can fully or partially mask the light permeable plane 310a. The masked area depends on requirements and is not restrictive in the invention.

The seat 10 includes a body 11, a clamp portion 12 connected to one side of the body 11 to be wedged in by the support frame 31a for coupling therewith, and an extended portion 13 connected to the body 11 remote from the clamp portion 12. The body 11 has a first connection plane 111 faced the extended portion 13. The extended portion 13 has a second connection plane 131 faced the body 11. In this embodiment the clamp portion 12 has two extended sections 121 at one side of the body 11 remote from the extended portion 13 and spaced from each other, two hook sections 122 located respectively at one end of one extended section 121 and extended toward another extended section 121, and an opening 24 located between the two hook sections 122 to be wedged in by the support frame 31a. The hook sections 122 have an interval formed between them at a distance slightly smaller than the thickness of the shade screen 30a (i.e., the total thickness of the support frame 31a and the sunshade cloth 32a after assembly) so that user can wedge the shade screen 30a into the interval of the extended sections 121 through a small force.

The bonding member 20 is bonded to the first connection plane 111 and the second connection plane 131, and includes a first bonding surface 21 corresponding to the first connection plane 111, and a second bonding surface 22 corresponding to the second connection plane 131. The first bonding surface 21 and the second bonding surface 22 are bonded respectively to the window frame plane 322a at two ends of the bend portion 121 of the vehicle window frame 320. Thus, the holding structure 1 can be attached to the vehicle window frame 320a via the first bonding surface 21 and the second bonding surface 22 at different angles, thereby enhance bonding stability between the holding structure 1 and the vehicle window frame 320a.

Figure 1:
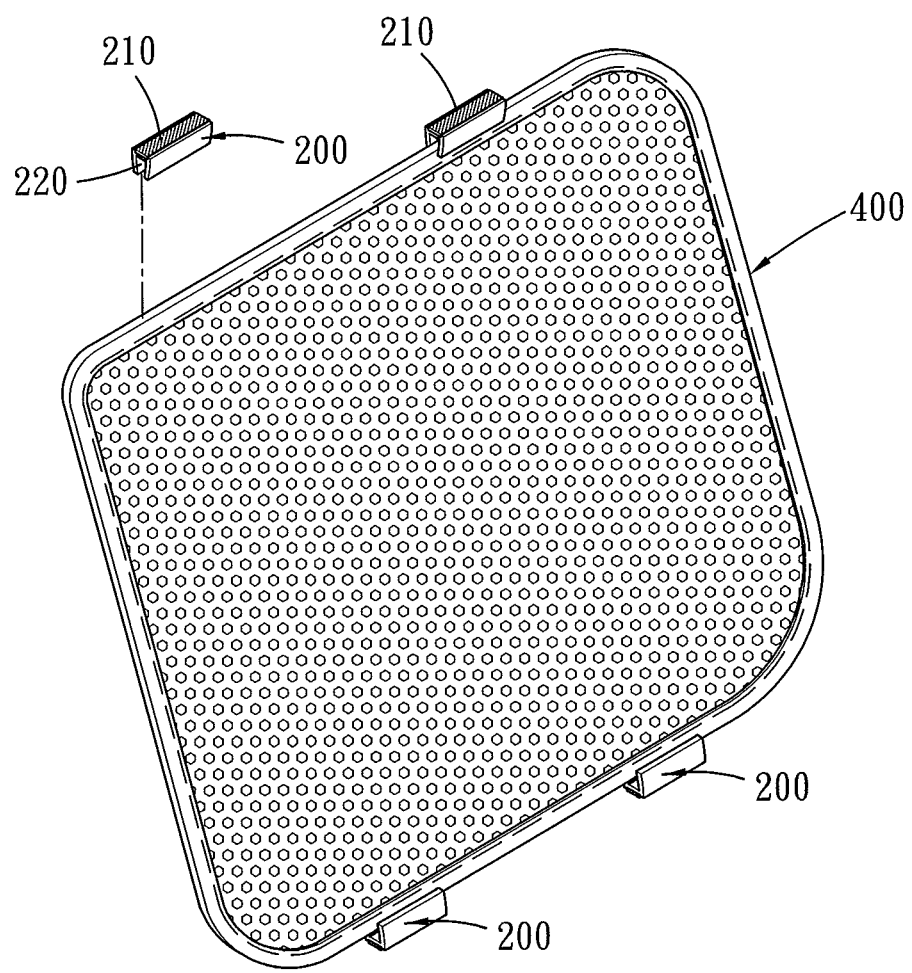
FIG. 1 is an exploded view of a sunshade holding structure of a prior technique.
Figure 2:
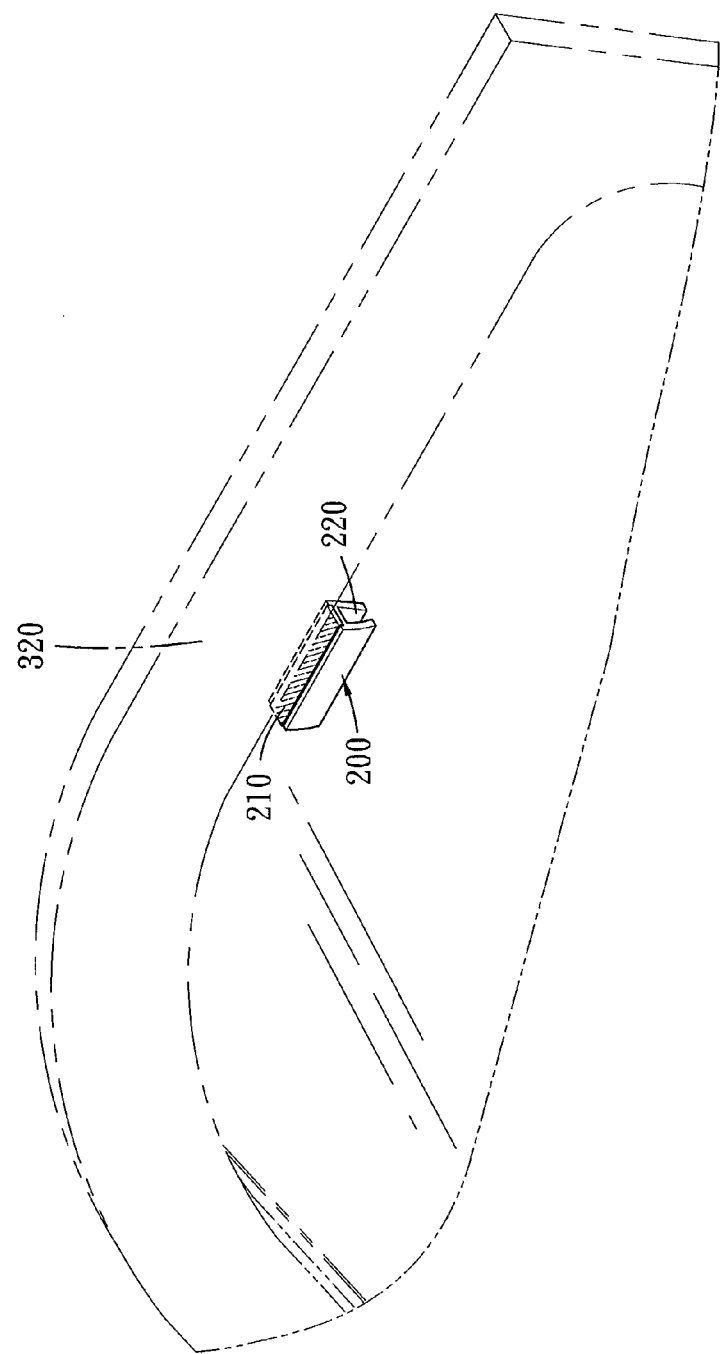
FIG. 2 is a schematic view of the sunshade holding structure of a prior technique in an installation condition.
Figure 6:
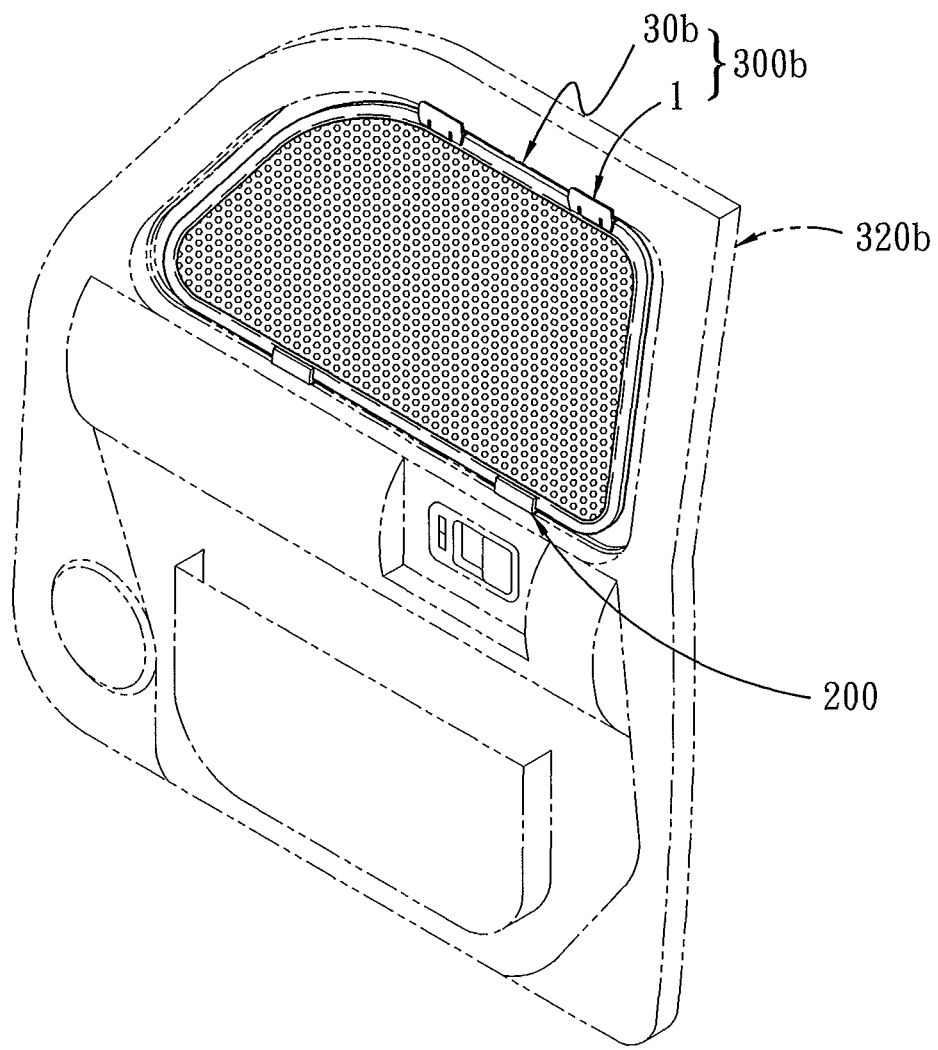
FIG. 6 is a perspective view of the vehicle sunshade of the invention in a second implementation condition.

Next, please refer to FIG. 6 for a second embodiment of the vehicle sunshade of the invention. Since the vehicle window frame 320b of some vehicle types has different sizes of flat surface at the top end and the bottom end, mounting the seat 10 of the invention on the bend portion of the top end and the bottom end of the vehicle window frame 320b could make the vehicle sunshade 300b connected to the vehicle window frame 320b in a skewed manner that is undesirable. To enhance coupling stability of the vehicle sunshade 300b, the vehicle sunshade 300b further includes at least one holding block 200 located on one vehicle window frame 320b corresponding to the seat 10. Also referring to FIG. 1, each holding block 200 includes a holding zone 220 to be wedged in by the support frame 31b of the shade screen 30b for coupling, and a double-sided adhesive 210 located at one side remote from the holding zone 220 to bond to the vehicle window frame 320b. Thus, this embodiment can employ the holding structure 1 previously discussed to connect to a smaller flat area of the vehicle window frame 320b at the bend spot of the top end, then the conventional holding block 200 can be used to connect to a larger flat surface at the bottom end of the vehicle window frame 320b. Thereby the upper side and the lower side of the shade screen 30b can be clamped respectively by the holding structure 1 and the holding block 200. Based on the aforesaid structure the shade screen 30b can be securely bonded to the vehicle window frame 320b to block sunshine from entering the vehicle through the light permeable plane 310b.

Figure 7A:
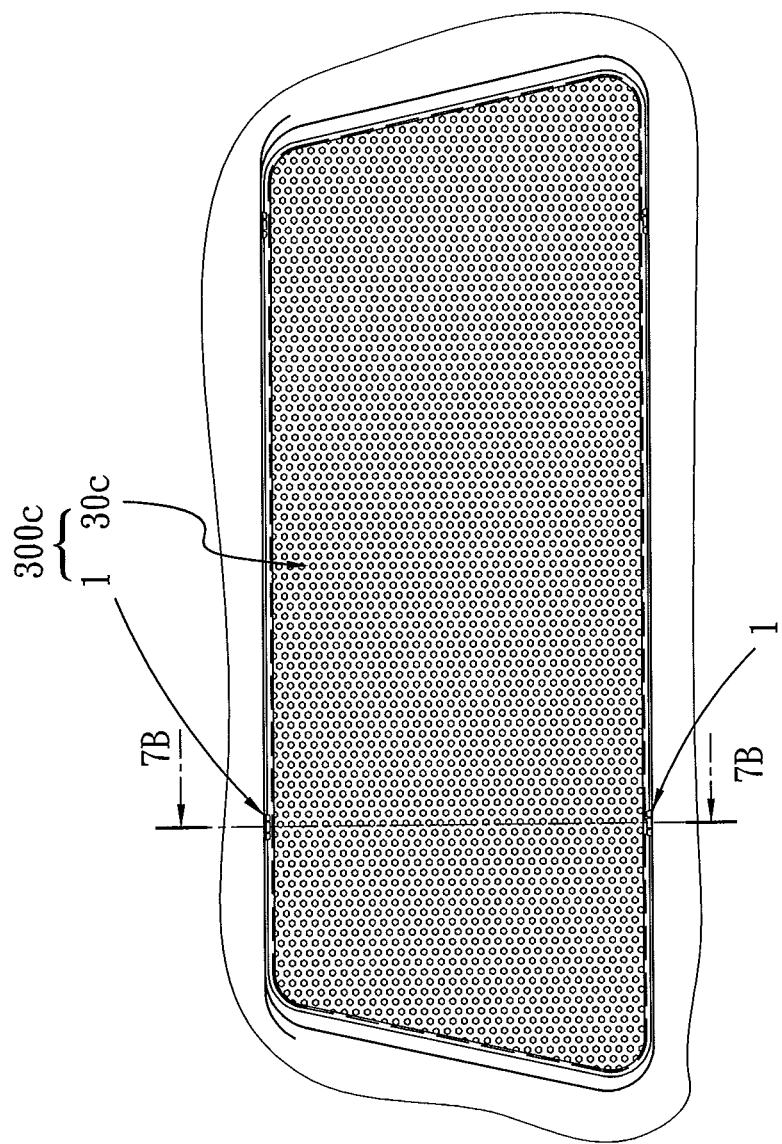
FIG. 7A is a perspective view of the vehicle sunshade of the invention in a third implementation condition.
Figure 7B:
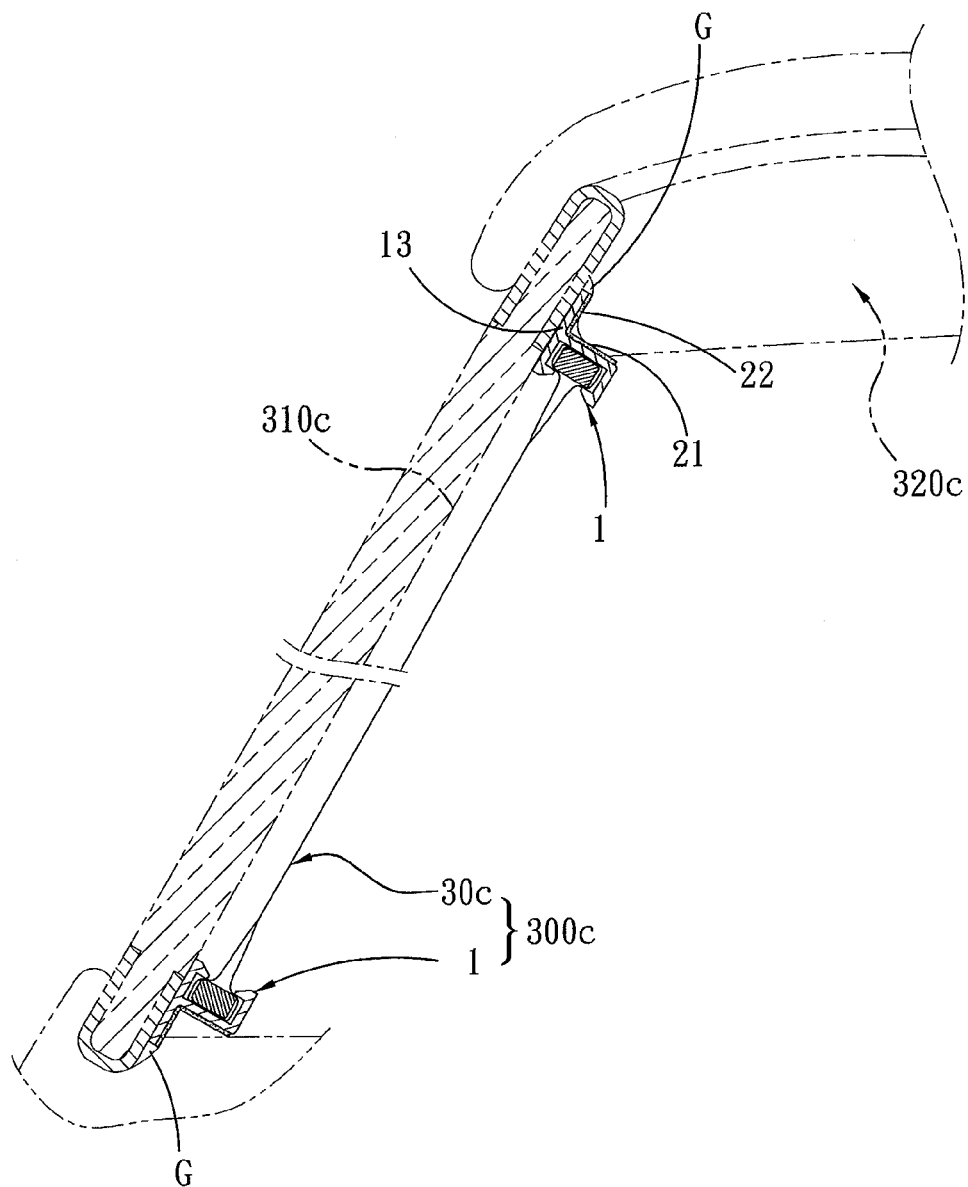
FIG. 7B is a plane sectional view taken on line 7B-7B in FIG. 7A.

Please refer to FIGS. 7A and 7B for a third embodiment of the vehicle sunshade of the invention. The vehicle sunshade 300c in this embodiment can be adopted on the front window or the rear window of a vehicle. Take the vehicle rear window as an example for discussion here. The holding structures 1 are positioned respectively at the top end and the bottom end of the vehicle window frame 320c. The shade screen 30c bridges the holding structures 1. One vehicle window frame 320c and the light permeable plane 310c form a gap G between them. The extended portion 13 of the seat 10 can be inserted into the gap G; and by bonding the first bonding surface 21 and the second bonding surface 22 of the holding structure 1 to the vehicle window frame 320c the vehicle sunshade 300c can be securely attached to the vehicle window frame 320c.

As a conclusion, the invention, through the holding structure that includes the seat with the body and the first connection plane and the second connection plane of the extended portion, and by bonding the bonding member to the first connection plane and the second connection plane to form the first bonding surface and the second bonding surface that can be bonded to the window frame plane at two ends of the bend portion of the vehicle window frame, can enhance coupling stability of the vehicle sunshade. Furthermore, the holding structure of the invention can be collaborated with the conventional sunshade holding block to be used on the side windows and the rear window of the vehicle.

What is claimed is:

1. A holding structure, comprising:
   a seat including a body, a clamp portion connected to one side of the body and an extended portion extended from the body towards a direction remote from the clamp portion; the body including a first connection plane faced the extended portion, the extended portion including a second connection plane faced the body; and
   a bonding member which is bonded to the first connection plane and the second connection plane and includes a first bonding surface corresponding to the first connection plane and a second bonding surface corresponding to the second connection plane.

2. The holding structure of claim 1, wherein the clamp portion includes two extended sections at one side of the body remote from the extended portion and spaced from each other, and two hook sections located respectively at one end of one extended section remote from the body and faced another extended section.

3. The holding structure of claim 1, wherein the second connection plane is formed in a trapezoidal shape at a width gradually shrunk remote from the body, the extended portion including two chamfered angles at one end thereof remote from the body.

4. The holding structure of claim 1, wherein the bonding member includes a first adhesive bonded to one side of the first connection plane and faced the second connection plane to form the first bonding surface, and a second adhesive bonded to one side of the second connection plane and faced the first connection plane to form the second bonding surface.

5. The holding structure of claim 1, wherein the bonding member includes a release layer to cover the first bonding surface and the second bonding surface.

6. A vehicle sunshade installed on a vehicle to block light outside the vehicle which includes at least one light permeable plane and a plurality of vehicle window frames located annularly on the circumference of the light permeable plane, each vehicle window frame including two non-parallel window frame planes, the vehicle sunshade comprising:
- a shade screen corresponding to the light permeable plane and including a sunshade cloth to cover the light permeable plane to restrict light from entering the vehicle and a support frame annularly located on the circumference of the sunshade cloth;
- a seat including a body, a damp portion connected to one side of the body to be wedged in by the support frame for coupling, and an extended portion extended from the body towards a direction remote from the clamp portion, the body including a first connection plane faced the extended portion, the extended portion including a second connection plane faced the body; and
- a bonding member which is bonded to the first connection plane and the second connection plane and includes a first bonding surface corresponding to the first connection plane and a second bonding surface corresponding to the second connection plane, the first bonding surface and the second bonding surface bonding respectively the two window frame planes of one vehicle window frame.

7. The vehicle sunshade of claim 6, wherein the clamp portion includes two extended sections at one side of the body remote from the extended portion and spaced from each other, and two hook sections located respectively at one end of one extended section remote from the body and faced another extended section, and an opening formed between the two hook sections to be wedged in by the support frame.

8. The vehicle sunshade of claim 6, wherein the bonding member includes a first adhesive bonded to one side of the first connection plane and faced the second connection plane to form the first bonding surface, and a second adhesive bonded to one side of the second connection plane and faced the first connection plane to form the second bonding surface.

9. The vehicle sunshade of claim 6, wherein one of the vehicle window frames forms a gap with the light permeable plane to receive insertion of the extended portion of the seat.

10. The vehicle sunshade of claim 6 further including at least one holding block located on one vehicle window frame and corresponding to the seat, each holding block including a holding zone wedged in by the support frame for coupling and a double-sided adhesive located on one side thereof remote from the holding zone to bond to the vehicle window frame.

\* \* \* \* \*